July 7, 1925.  1,544,655
A. KREBS
METAL WORKING MACHINE
Filed June 2, 1922     2 Sheets-Sheet 1
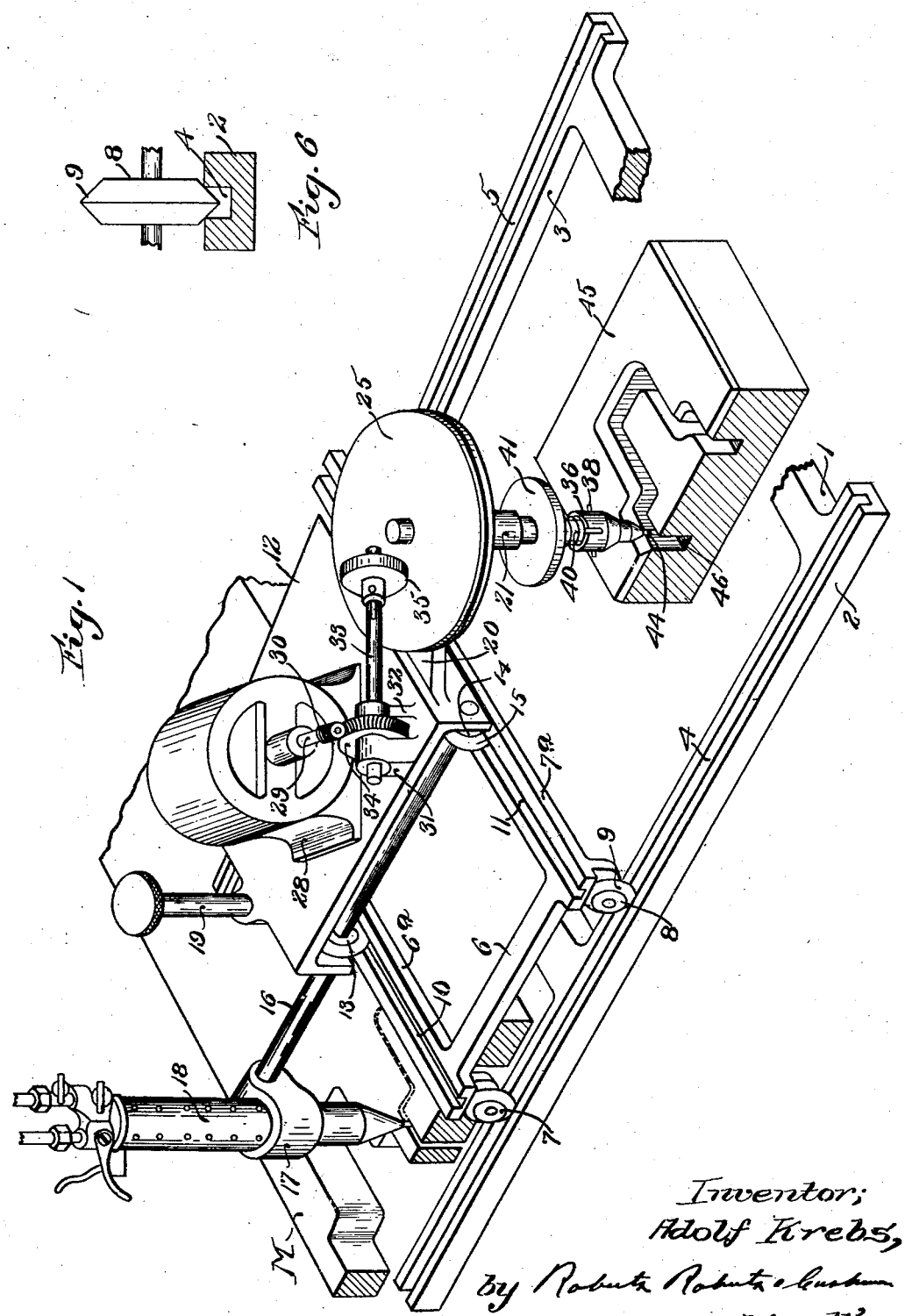
Inventor;
Adolf Krebs,
by Roberts Roberts & Cushman
his attys.

July 7, 1925.

A. KREBS

METAL WORKING MACHINE

Filed June 2, 1922

Inventor;
Adolf Krebs,
by Roberts, Roberts & Cushman
his attys.

Patented July 7, 1925.

1,544,655

UNITED STATES PATENT OFFICE.

ADOLF KREBS, OF BOSTON, MASSACHUSETTS.

METAL-WORKING MACHINE.

Application filed June 2, 1922. Serial No. 565,480.

*To all whom it may concern:*

Be it known that I, ADOLF KREBS, a citizen of Germany, and resident of Boston, in the county of Suffolk and State of Massachusetts, have invented new and useful Improvements in Metal-Working Machines, of which the following is a specification.

This invention relates to automatic apparatus of that general character wherein a tool or other operative instrumentality is moved relatively to the material operated upon as determined by a pattern element, and relates more particularly to mechanism for working material by means of a tool or other implement supported for free movement in all desired directions and automatically controlled and moved by power actuated driving and guiding elements engageable with a template member and serving to cause the tool to describe a path accurately corresponding to the guiding surface of the template. Such mechanism is particularly well adapted for use in controlling the operation of a thermal instrumentality, such for example as the oxy-hydrogen or oxy-acetylene blow torch or the electric arc either for cutting or welding metal, and where it is desired to move such instrumentality in an accurate and reliable manner and in accordance with a pattern of predetermined configuration.

The cutting of irregular shapes from metal in accordance with a predetermined pattern is extremely slow and laborious when performed purely by mechanical cutting agencies such, for example, as milling cutters. Moreover, the pressure necessarily employed between such a cutter and the work makes it difficult to follow a template or pattern with exactitude, while the pattern must ordinarily be of very strong and rigid material, such as hardened steel, in order to withstand the great friction and wear to which it is subjected. In order to speed up production it has heretofore been proposed to substitute for the mechanical cutting device commonly employed, an implement using heat as the cutting agency as, for example, the oxy-acetylene blow torch. By the employment of such a cutting instrumentality, the rate of cutting of the metal has been very greatly increased, but so far as is known certain other of the advantages to be secured from the use of such a cutting implement have not been fully appreciated, with the result that while employed widely as a hand tool for cutting metal, the blow torch has not been used to as great an extent as it might well have been for the automatic cutting of intricate shapes in accordance with predetermined patterns or templates. This situation has been occasioned more especially from a failure to realize that with a blow torch as the cutting instrumentality, no lateral pressure between the work and tool is necessary, so that in place of rigid steel templates, which are very costly to produce, templates of relatively soft and easily workable material such, for example, as indurated fiber, may under proper conditions be employed for guiding the cutting instrumentality over the work. Material such as just referred to may be cut to shape so easily as to make it practicable to employ an automatic cutting apparatus in the forming of even a single metallic part, while at the same time templates made of such material are found to remain in good condition even after long continued use. When attempts have heretofore been made to employ a blow torch as the cutting implement in automatic cutting machines, one source of criticism of the operation of such machines has been their failure to transcribe sharply varying curves or angles of the template with sufficient accuracy upon the metal being cut, so that the finished shape fails in many cases to conform as closely as desired to the template or pattern. Such inaccuracy in operation has in most instances arisen from one of two general causes; first, the employment of a template following roll or other guide element of so large a size that it is unable accurately to follow the contour of the template, especially if such contour comprise sharp turns, curves, or re-entrant angles; and second, from the practice of transmitting movement of the template following element to the cutting instrumentality by the use of links or lever arms, such arrangements, even though carefully made, exhibiting a certain degree of lost motion particularly when the linkage employed comprises a series of pivotally connected parts. As great accuracy of contour is in many cases necessary, such inability of the machine to produce exact copies of the pattern has been sufficient to exclude it from use in many establishments where but for such defects it would be a welcome addition to the mechanical equipment.

One object of the present invention is accordingly to provide a strong and substantial, but simple mechanism, of the type wherein heat is employed as the operative agency, of a character such as to permit of automatically cutting shapes which duplicate the template or pattern with the greatest precision and nicety, regardless of the complexity of contour of the pattern, the occurrence of angles or rapid changes in curvature therein, or the thickness of the material operated upon.

Further objects are to provide an improved machine of the class described such that the operative implement, whether in cutting or welding, may be positively and accurately guided along the desired path by the use of a template of relatively inexpensive construction, and to provide a template structure for use with the improved machine above referred to, such template being so constructed and arranged as to furnish accurate guiding elements capable of long continued use while permitting relatively soft and easily workable materials to be employed in its construction.

Briefly stated the present invention consists in providing a tool supporting carriage mounted upon anti-friction supports for universal movement in a horizontal plane, and a motor driven shaft arranged to be driven at different speeds, mounted upon the carriage and provided with a driving roll adapted to have frictional, non-slipping engagement with a template surface, the movement of the driving roll along the template serving to propel a template following or guiding element which is associated with the drive roll. By the employment of such a driving roll, the guiding element is relieved of any duty other than that of following along a suitable template surface, and may thus be of such small dimensions as to permit it accurately to follow such surface, even though the latter comprise sharp curves or angles. With this arrangement the operative implement and the template following or guide element, being mounted upon the same moving part (the rigid carriage), are held accurately in absolutely unvarying relationship so that the slightest movement of the follower or guide element is imparted without diminution or change to the metal working instrument.

Preferably the template surfaces with which the driving roll and guide element engage, respectively, are formed as the opposite walls of a guide channel, slot or groove, that wall of the channel with which the drive roll engages having a beveled face with which a correspondingly beveled surface of the drive roll contacts. Preferably also, the drive roll is axially movable and is yieldingly urged in an axial direction, the result of which is that the reaction of its beveled surface against the beveled face of the template tends to move the roll transversely of the guide channel, thereby causing the guide element, which is associated with the drive roll, to press firmly against the opposite, or guiding wall of the channel. Preferably the means employed for imparting the axial movement to the drive roll is so devised as to avoid any reaction against the carriage or associated parts such as might in any manner interfere with the accuracy of operation of the mechanism.

The invention furthermore resides in the provision of a template of fiber or other suitable material provided with a suitable channel, slot, groove, or contour, preferably provided with a beveled face with which the follower roll may frictionally engage as above referred to, such template being of such form as to permit of its construction by a simple milling operation.

Although very useful in the cutting of metal plates or sheets it is evident that the tool guiding and actuating mechanism is of much broader utility and might well be employed for controlling the movement of any desired form of tool or instrumentality in an accurate manner whereby to produce exact replicas of a pattern member or template, and it is contemplated that in so far as the broader aspects of the invention are concerned, it may and will be applied to other arts and operations than those above specifically referred to.

In the accompanying drawings there is illustrated by way of example a preferred arrangement of parts whereby the above objects may be attained.

Fig. 1 is a perspective view of the mechanism forming the subject-matter of the present invention, certain parts being broken away for clearness in illustration, the guiding template also being shown, as well as the work being operated upon;

Fig. 6 is a detail vertical section through a guide rail employed, showing a carriage supporting wheel engaging the groove in such rail.

Figure 2:
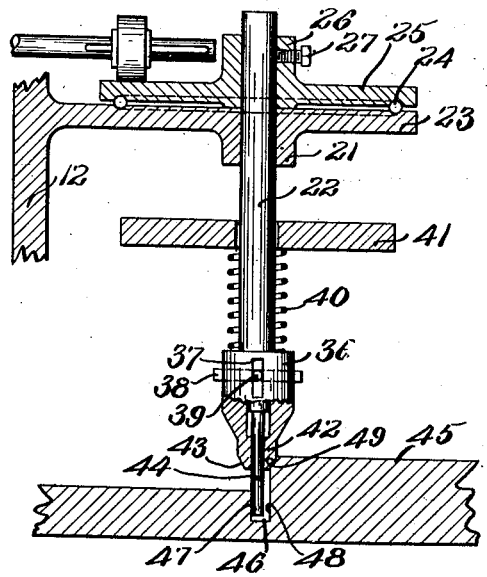
Fig. 2 is a vertical cross section through the template following roll and associated parts.

Referring to Figs. 1 and 2, a supporting frame is indicated by the numeral 1, such frame being provided with a pair of substantially parallel guide rails 2, 3 respectively. These guide rails are preferably furnished respectively with guiding grooves 4, 5, of substantially rectangular cross section, as seen in Fig. 1. A carriage 6 is arranged to move longitudinally along the guide rails 2, 3, this carriage being provided with wheels such as 7, 8 for supporting it. Preferably the supporting wheels are furnished with beveled rims of substantially V cross section, as indicated at 9 (Fig. 6), the wheel being of such a width that the beveled rim thereof engages the upper edges of the guide groove in the rail, thus very accurately guiding the carriage 6 in its movement along the rail. The carriage 6 is provided with a pair of substantially parallel rails 6$^a$, 7$^a$ respectively, such rails extending substantially at right angles to the rails 2, 3. The rails 6$^a$, 7$^a$ are also provided with grooves indicated at 10, 11 and a carriage 12 is mounted to move longitudinally of the rails 6$^a$, 7$^a$. This carriage 12 is supported upon wheels 13, 14 which are also preferably provided with beveled rims as indicated at 15 for engagement with the respective guide grooves 10, 11. With this arrangement it is evident that the carriage 12 is freely movable in any direction in a horizontal plane. A shaft 16 is mounted in bearings in one end of the carriage 12, such shaft being provided with a collar 17 in which is secured a blow torch 18 of any usual construction. The shaft 16 may be adjusted by means of a shaft 19 provided with a handle wheel for turning it.

Projecting from the opposite end of the carriage 12 is a bracket 20. This bracket may be integral with the carriage or secured thereto as desired, and is provided with a sleeve portion 21 which serves as a bearing for a vertical shaft 22. The bracket is also provided with a disc-like portion 23 concentric with the axis of the sleeve 21, such disc-like portion having a circular groove therein for the reception of ball bearings 24. Resting upon such ball bearings is a second disc 25 having a sleeve or hub portion 26 which is secured to the shaft 22 by means of a set screw 27. The disc 25 thus serves to support the shaft 22, while the ball bearings 24 permit the shaft to turn very freely. Mounted upon the carriage 12 is an electric motor of any desired type having a shaft 29 provided with a worm 30. Brackets 31 and 32 upstanding from the carriage 12 provide bearings for a shaft 33 having worm wheel 34 engaging the worm 30. A roll 35 is splined to the shaft 33 for longitudinal adjustment thereon, this roll engaging the disc 25 and serving to drive the latter. By adjusting the roll 35 along the shaft 33 it is evident that the speed of rotation of the shaft 22 may be varied.

Figure 4:
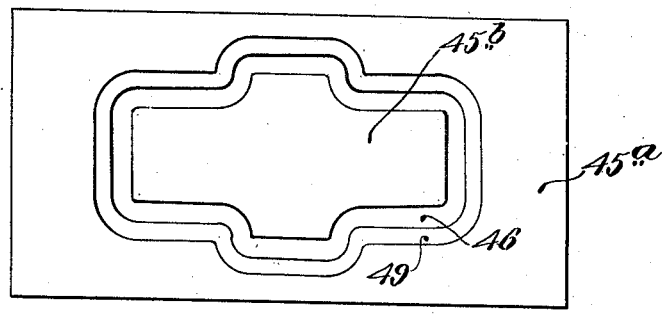
Fig. 4 is a plan view of a template useful in connection with the apparatus of the present invention.
Figure 5:
Fig. 5 is a transverse vertical cross section through such a template illustrating the mode of making the same.

Upon the lower part of the shaft 22 a sleeve 36 is mounted, this sleeve being slidable longitudinally of the shaft and having intersecting diametral slots such as 37 into which project suitable pins such as 38, 39 fast in the shaft. These pins thus constitute splines or keys serving to transmit motion of rotation from the shaft to the sleeve while permitting longitudinal movement of the sleeve upon the shaft. A coil spring 40 surrounds the shaft and rests upon the upper end of the sleeve 36. A disc member 41 of substantial weight is arranged to rest upon the upper end of spring 40, such disc being freely slidable upon the shaft and constituting an abutment for the upper end of the spring. The lower portion of the sleeve 36 is reduced in diameter, as indicated at 42, and terminates in a beveled face 43 constituting a template following roller as will hereinafter be described. The lower end of the shaft 22 is reduced in diameter as indicated at 44 and projects below the lower end of the sleeve 36. This reduced portion 44 constitutes a guide element or a template follower which is adapted to engage the guiding wall 47 of a guide groove 46 formed in a template 45. The wall 47 of this guide groove is preferably less in height than the opposite wall 48 thereof and the latter wall at its upper edge is beveled as indicated at 49 to cooperate with the beveled follower roll 43. The template 45, in accordance with the present invention, may be made of some relatively soft material such for example as indurated fiber and may be machined from an integral block comprising an outer portion 45$^a$ (Fig. 5) and a central portion 45$^b$, the latter being of less thickness than the outer portion. Such a block may be machined by the use of a milling cutter comprising the cylindrical portion 50 and the beveled portion 51, such a cutter serving simultaneously to form the slot 46 and the beveled surface 49.

Figure 3:
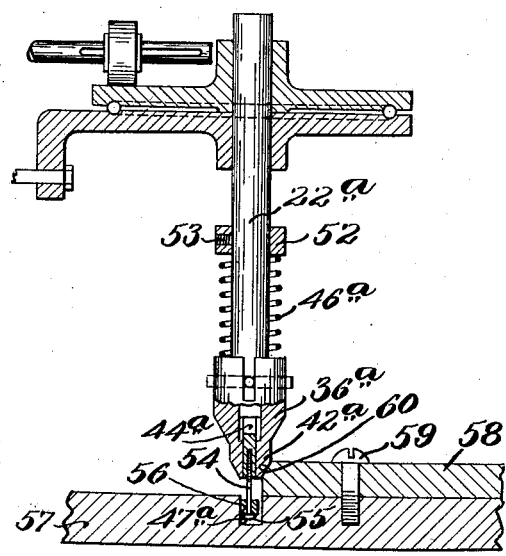
Fig. 3 is a view similar to Fig. 2, but illustrating a modification.

In Fig. 3 a modified arrangement of the template following elements is shown. In this figure the shaft 22$^a$ is shown as provided with a sleeve 36$^a$ secured thereto in the same manner as described with respect to the sleeve 36 of Fig. 2. Resting upon the upper end of the sleeve is a coil spring 46$^a$ whose upper end bears against a collar 52 adjustably secured by means of a set screw 53 to the shaft. The lower end of the sleeve 36$^a$ is reduced in diameter as indicated at 42$^a$ corresponding to the portion 42 of the sleeve 36, and is similarly beveled to form a template following roll. The reduced portion 44$^a$ of the shaft 22$^a$ is of less length than that shown in Fig. 2, terminating substantially at the lower end of the sleeve 36$^a$, and is provided with an internal screw-threaded bore with which engages the threaded end of a bolt 54 having a head 55. Journalled to turn upon this bolt 54 is a roll 56 constituting the guide element or tracer, such roll engaging the wall 47ª of the template. In this case the template is shown as comprising the lower part 57 and the upper member 58 such parts being secured together by means of a screw 59. Such a template may be constructed from ordinary sheet material of suitable thickness, the upper and lower parts being first secured together and then milled simultaneously to provide the guide slot and the beveled surface 60.

In the operation of the device as shown in Fig. 1, the torch is first adjusted so that it is accurately vertical and the material M is placed in proper position for cutting by the action of the torch flame. The template 45 is now positioned beneath the follower device, the guide element or tracer 47 being caused to engage with the inner wall of the template groove, while the follower roll 43 is caused to engage with the beveled face 49 of the outer wall. As the weight of the disc 41 normally compresses the spring 40, the sleeve 36 tends to descend and thus reacts against the beveled surface 49 to cause the guide element 44 to engage the wall 47 of the groove very closely, and to follow such wall accurately throughout its entire contour. At the same time the spring action causes the roll 43 to engage the surface 49 with considerable pressure so that there is little, if any, tendency for the roll to slip relatively to the surface of the template. The motor 28 is started into operation and the torch blast is turned on. As the disc 25 is rotated, the sleeve 22 turns therewith and thus the roll 43 is caused to travel along the beveled surface 49 of the template. The guide member 44, which is of relatively small diameter as compared with the driving roll, follows the contour of the template with great accuracy and as the shaft 22 and the torch 18 are both rigidly supported by the carriage 12, it is evident that the slightest movement of the guide element in following the template must be transmitted without substantial change to the torch. The movement of the latter thus corresponds with great exactitude to that of the guide member or tracer and the material is cut to a shape closely corresponding to that of the template. By reason of the fact that the guide member 44 is relatively small, it is possible for such member accurately to follow sharp turns, curves or re-entrant angles in the template, while at the same time the roll 43 being of relatively large diameter serves as an efficient driving means for causing the guide member 44 to travel along the template slot. It is also to be noted that the vertical component of pressure between the roll 43 and the template is taken up entirely by the disc 41 and is not transmitted to the carriage 12. Thus regardless of the pressure which may be employed between the follower roll and the template, and regardless of any lack of smoothness in the template surface 49, the carriage 12 is permitted to remain in a substantially horizontal plane throughout the entire operation, so that there is no tendency to throw the torch out of proper alignment with the work or in any manner to interfere with the proper transmission of movement from the guiding member 44 to the torch. The template employed may be made very readily by the use of an ordinary milling cutter which may for example be mounted in a drill press or other machine tool having a vertical shaft, and as the pressure between the guide member 44 and the template may be relatively light, it is possible to make such template from fiber or other material of a like character which can be machined with the greatest ease. In fact, a template may be made so readily that even were it desired to cut but a single specimen of a certain contour it would still be worth while to prepare a template especially for such work as the preparation of the template and the cutting of the material by the use of this apparatus may easily be performed in far less time than it would be possible to perform the same operation in any other known manner.

It may in some cases be desirable to employ arrangements such as shown in Fig. 3, wherein instead of disc 41 for weighting the spring 40, the spring 46ª may be tensioned by means of the adjustable collar 42. In the latter instance, however, the vertical component of thrust is taken up by the carriage 12, and while in most instances inappreciable, such component might under unusual circumstances be sufficient to interfere to a small extent at least with the accuracy of the operation so that the device of Fig. 2 is in most cases to be preferred. In Fig. 3 the guide member or tracer is also shown as consisting of a small roller 56 carried by the shaft 22ª. When the template comprises relatively slight curves, and is devoid of sharp angles, such an arrangement may be preferable, as it serves to relieve the parts of a certain amount of friction, but if the template curve is of a contour involving sharp turns or angles, the arrangement shown in Fig. 2 is preferred. In the latter figure while the guide member 44 is indicated as an integral extension of shaft 22, it is to be understood that the member 44 might well be an independent element inserted in a longitudinal bore in the shaft 22 or otherwise secured thereto. While a simple form of template has herein been shown as well adapted for use with the machine disclosed, it is contemplated that templates of other form, construction or material may be substituted therefor while retaining many of the advantages above enumerated.

While a specific arrangement of parts has herein been disclosed as desirable for securing the objects of the invention, it is to be understood that various changes in shape or dimensions of the parts employed, as well as in their specific arrangement might well be made without departing from the spirit of the invention.

What I claim and desire to secure by Letters Patent of the United States is:

1. A machine of the class described comprising a carriage having wheels, one at least of said wheels being provided with a rim whose central part is of greater diameter than its edge portion, rails for supporting said wheels, one of said rails having a groove for receiving the central portion of said wheel rim, means supporting said rails for bodily movement, a blow-torch mounted upon the carriage, and means also mounted upon the carriage for imparting movement thereto.

2. A machine of the class described comprising a carriage having wheels, one at least of said wheels being provided with a beveled rim, rails for supporting said wheels, one of said rails having a groove for receiving said beveled wheel rim, means supporting said rails for bodily movement, a blow torch mounted upon the carriage, and means also mounted upon the carriage for imparting movement thereto.

3. A machine of the class described comprising a rigid carriage having supporting wheels provided with rims of V cross section, rails for guiding said wheels, said rails having grooves therein for the reception of the wheel rims, means for supporting said rails for bodily movement in a direction at right angles to their lengths, a thermal implement secured to the carriage, a shaft journalled in the carriage, a motor for rotating the shaft, and means carried by the shaft for cooperation with a fixed template.

4. A machine of the class described comprising a pair of rails having grooves therein, a carriage having wheels engageable with said grooves, a pair of rails fixed to the carriage and extending transversely of the first rails, said second rails having grooves therein, a second carriage having beveled wheels engageable with the upper edges of the latter grooves, cutting means mounted upon the second carriage, a shaft journalled in the latter carriage, means for rotating the shaft, and means carried by the shaft for engagement with a guiding template.

5. A machine of the class described comprising a rigid carriage supported for universal movement in a given plane, a motor mounted upon the carriage, a shaft journalled in bearings supported by the carriage, means carried by the shaft and engageable with a guiding template, and means interposed between the motor and shaft permitting the latter to be driven at different speeds.

6. A machine of the class described comprising a rigid carriage supported for universal movement in a given plane, a bracket secured thereto and provided with bearings, a shaft journalled in said bearings, a driving roll secured to the shaft for engagement with a guiding template, a motor mounted upon the carriage, and variable speed friction drive means for transmitting power from the motor to the shaft.

7. A machine of the class described comprising a rigid movable carriage, a motor mounted thereon, a shaft journalled to turn in a plane substantially parallel to that of the movement of the carriage, worm and wheel drive connections between the motor and shaft, a second shaft journalled to turn in bearings supported by the carriage, said second shaft being substantially perpendicular to the first, a disc fixed to the second shaft, a roll splined to the first shaft for adjustment longitudinally thereof and frictionally engaging said disc for transmitting movement to the latter, and means associated with the second shaft for determining movement of its carriage.

8. A machine of the class described comprising a movable carriage, a rotary shaft supported thereby, a template engaging element rotating with the shaft and movable in a direction axial thereof, and means independent of the carriage normally urging said element in such axial direction.

9. A machine of the class described comprising a movable carriage, a rotary shaft carried thereby, a template engaging roll connected to the shaft for rotation therewith but slidable longitudinally thereof, and means independent of the carriage for urging said roll longitudinally of the shaft.

10. A machine of the class described comprising a rigid, movable carriage, a shaft journalled therein, means for rotating the shaft, a roll having a beveled peripheral face for engagement with a corresponding beveled template surface, said roll being connected to the shaft for axial movement relatively thereto, and gravity means constantly acting to urge the roll axially along the shaft, whereby to press the beveled face thereof into contact with the beveled surface of the template.

11. A machine of the class described comprising a rigid, movable tool carriage, a substantially vertical shaft journalled therein, a template engaging roll carried by the shaft and movable axially thereof, and a freely movable weight constructed and arranged normally to urge the roll toward the lower end of the shaft.

12. A machine of the class described comprising a horizontally movable carriage, a vertical shaft journalled therein, a roll splined to the shaft to rotate therewith but slidable axially thereof, said roll having a beveled peripheral surface for engagement with a beveled template surface, a spring surrounding the shaft and bearing at one end against the roll, and a freely movable weight bearing against the opposite end of the spring and constituting an abutment therefor.

13. A machine of the class described comprising a vertically disposed rotary shaft, a sleeve splined to the lower end of the shaft for movement axially therealong, said sleeve carrying a template engaging roller, a coil spring surrounding the shaft and bearing at its lower end against the upper end of the sleeve, and a weight provided with a central opening for the reception of the shaft, said weight being freely slidable along the shaft and constituting an abutment for the upper end of the spring.

Signed by me at Boston, Mass., this 16th day of May, 1922.

ADOLF KREBS.